(12) United States Patent
Kim

(10) Patent No.: US 10,155,476 B2
(45) Date of Patent: Dec. 18, 2018

(54) CAMERA APPARATUS OF VEHICLE

(75) Inventor: Junghum Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 643 days.

(21) Appl. No.: 14/234,913

(22) PCT Filed: Jul. 27, 2012

(86) PCT No.: PCT/KR2012/006038
§ 371 (c)(1),
(2), (4) Date: Jan. 24, 2014

(87) PCT Pub. No.: WO2013/024981
PCT Pub. Date: Feb. 21, 2013

(65) Prior Publication Data
US 2014/0176718 A1 Jun. 26, 2014

(30) Foreign Application Priority Data

Aug. 17, 2011 (KR) .................. 10-2011-0081730

(51) Int. Cl.
*B60Q 1/48* (2006.01)
*B60R 1/00* (2006.01)
(Continued)

(52) U.S. Cl.
CPC .............. *B60Q 1/48* (2013.01); *B60K 35/00* (2013.01); *B60R 1/00* (2013.01); *G06K 9/00805* (2013.01);
(Continued)

(58) Field of Classification Search
CPC .... B60Q 1/48; B60R 1/00; B60R 1/08; B60R 2300/8053; B60R 2300/806;
(Continued)

(56) References Cited

U.S. PATENT DOCUMENTS 6,124,808 A * 9/2000 Budnovitch ............. B60Q 1/48
340/691.1
8,299,942 B2 * 10/2012 Ko ........................ G06T 3/4038
340/435
(Continued)

FOREIGN PATENT DOCUMENTS

EP 1 083 076 A2 3/2001
EP 1 134 718 A2 9/2001
(Continued)

*Primary Examiner* — Joseph G Ustaris
*Assistant Examiner* — William Adrovel
(74) *Attorney, Agent, or Firm* — Birch, Stewart, Kolasch & Birch, LLP

(57) ABSTRACT

A camera apparatus of a vehicle is disclosed. The camera apparatus is such that an image quality of an image can be adequately changed in response to brightness of an optical image of a subject to allow a driver to view a bright image even in the night, thereby preventing an accident and enabling a safe driving, a width of a maximally opened door of a vehicle and a width of a parking space are compared to allow a character of whether to park to be combined with an image of a subject and displayed, thereby enabling a driver to safely park the vehicle, and a driver can view a moving object or obstacle at the rear of a vehicle when the driver is driving the vehicle backward, thereby preventing an accident from happening.

8 Claims, 4 Drawing Sheets

(51) Int. Cl.
| | |
|---|---|
| *B60R 1/08* | (2006.01) |
| *B60K 35/00* | (2006.01) |
| *G06K 9/00* | (2006.01) |
| *H04N 5/235* | (2006.01) |
| *H04N 5/351* | (2011.01) |
| *B60R 11/04* | (2006.01) |
| *G08G 1/16* | (2006.01) |
| *B62D 15/02* | (2006.01) |
| *G01S 13/93* | (2006.01) |
| *B60W 50/14* | (2012.01) |

(52) U.S. Cl.
CPC ...... *G06K 9/00812* (2013.01); *B60K 2350/00* (2013.01); *B60K 2350/106* (2013.01); *B60K 2350/1076* (2013.01); *B60K 2350/1084* (2013.01); *B60K 2350/1088* (2013.01); *B60K 2350/1096* (2013.01); *B60R 1/08* (2013.01); *B60R 11/04* (2013.01); *B60R 2300/70* (2013.01); *B60R 2300/802* (2013.01); *B60R 2300/806* (2013.01); *B60R 2300/8053* (2013.01); *B60R 2300/8066* (2013.01); *B60W 50/14* (2013.01); *B62D 15/027* (2013.01); *B62D 15/028* (2013.01); *G01S 13/93* (2013.01); *G01S 2013/9314* (2013.01); *G08G 1/16* (2013.01); *G08G 1/165* (2013.01); *G08G 1/166* (2013.01); *G08G 1/168* (2013.01); *H04N 5/2351* (2013.01); *H04N 5/351* (2013.01)

(58) Field of Classification Search
CPC .......... B60R 2300/70; B60R 2300/802; B60R 2300/8066; B60R 11/04; B60K 35/00; B60K 2350/106; B60K 2350/1076; B60K 2350/00; B60K 2350/1084; B60K 2350/1088; B60K 2350/1096; G06K 9/00805; G06K 9/00812; H04N 5/2351; H04N 5/351; G08G 1/16; G08G 1/165; G08G 1/166; G08G 1/168; B62D 15/027; B62D 15/028; G01S 13/93; G01S 2013/9314; B60W 50/14
See application file for complete search history.

(56) References Cited

U.S. PATENT DOCUMENTS

| | | | | |
|---|---|---|---|---|
| 2002/0104700 A1* | 8/2002 | Shimazaki | ............... | B60R 1/00 180/204 |
| 2002/0157889 A1* | 10/2002 | Mackle | .................. | B62D 1/00 180/204 |
| 2003/0052969 A1* | 3/2003 | Satoh | ....................... | B60R 1/00 348/148 |
| 2005/0085972 A1* | 4/2005 | Martinez | ................. | E05C 17/00 701/49 |
| 2005/0225439 A1* | 10/2005 | Watanabe | ............ | B62D 15/027 340/435 |
| 2006/0171704 A1* | 8/2006 | Bingle | .................... | B60R 11/04 396/419 |
| 2006/0220910 A1 | 10/2006 | Becker et al. | | |
| 2006/0287826 A1* | 12/2006 | Shimizu | .................. | B60K 35/00 701/431 |
| 2007/0230745 A1* | 10/2007 | Sawaki | ................... | G08G 1/161 382/104 |
| 2007/0230792 A1* | 10/2007 | Shashua | ............ | G06K 9/00369 382/190 |
| 2008/0049150 A1* | 2/2008 | Herbin | ..................... | B60Q 9/00 348/744 |
| 2008/0266396 A1* | 10/2008 | Stein | .................. | G06K 9/00805 348/148 |
| 2009/0073263 A1* | 3/2009 | Harada | ..................... | B60R 1/00 348/148 |
| 2009/0079828 A1* | 3/2009 | Lee | ............................ | B60R 1/00 348/148 |
| 2009/0167564 A1* | 7/2009 | Long-Tai | ........... | B62D 15/0285 340/932.2 |
| 2009/0174574 A1* | 7/2009 | Endo | ........................ | B60R 1/00 340/932.2 |
| 2009/0316018 A1* | 12/2009 | Umeda | ................... | H04N 5/235 348/223.1 |
| 2010/0013670 A1* | 1/2010 | Hueppauff | ......... | B62D 15/0275 340/932.2 |
| 2010/0019935 A1* | 1/2010 | Kawabata | ................. | B60R 1/00 340/932.2 |
| 2010/0259420 A1* | 10/2010 | Von Reyher | ......... | B62D 15/028 340/932.2 |
| 2010/0283633 A1 | 11/2010 | Becker et al. | | |
| 2011/0012718 A1* | 1/2011 | Uehara | ................... | G01S 13/89 340/435 |
| 2011/0025848 A1* | 2/2011 | Yumiba | ..................... | B60R 1/00 348/148 |
| 2011/0057813 A1* | 3/2011 | Toledo | ...................... | B60T 7/22 340/932.2 |
| 2011/0210868 A1* | 9/2011 | Yano | ..................... | B62D 15/027 340/932.2 |
| 2012/0133769 A1 | 5/2012 | Nagamine et al. | | |
| 2012/0154591 A1* | 6/2012 | Baur | ......................... | B60R 1/00 348/148 |
| 2012/0249789 A1 | 10/2012 | Satoh | | |
| 2013/0113614 A1* | 5/2013 | Yopp | ....................... | B60Q 9/00 340/438 |
| 2014/0019913 A1* | 1/2014 | Newman | ............... | G06F 3/0488 715/810 |
| 2014/0032031 A1* | 1/2014 | Okamura | ........... | B62D 15/0285 701/23 |

FOREIGN PATENT DOCUMENTS

| | | |
|---|---|---|
| EP | 1 134 718 B1 | 11/2004 |
| EP | 2 312 497 A1 | 4/2011 |
| JP | 10-11581 A | 1/1998 |
| JP | 2007-237857 A | 9/2007 |
| JP | 2007-272276 A | 10/2007 |
| JP | 2010-208372 A | 9/2010 |
| WO | WO 2010/073954 A1 | 7/2010 |
| WO | WO 2011/000392 A1 | 1/2011 |
| WO | WO 2011/016367 A1 | 2/2011 |
| WO | WO 2011/070640 A1 | 6/2011 |

* cited by examiner

[Fig. 1]
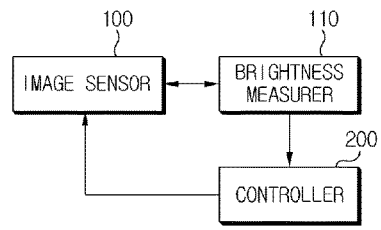
[Fig. 2a]
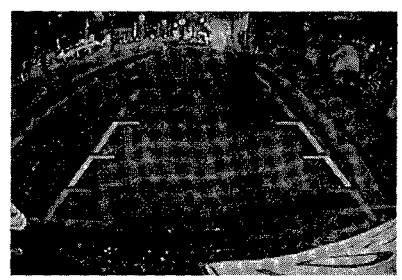
[Fig. 2b]
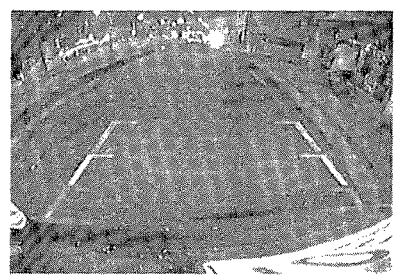
[Fig. 3]
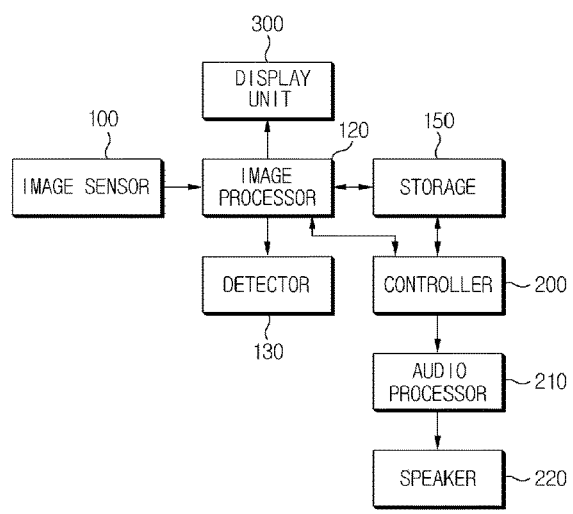

[Fig. 4]
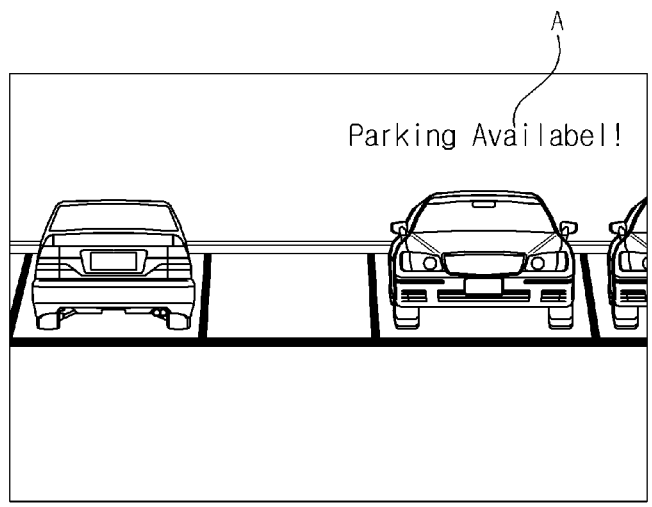
[Fig. 5]
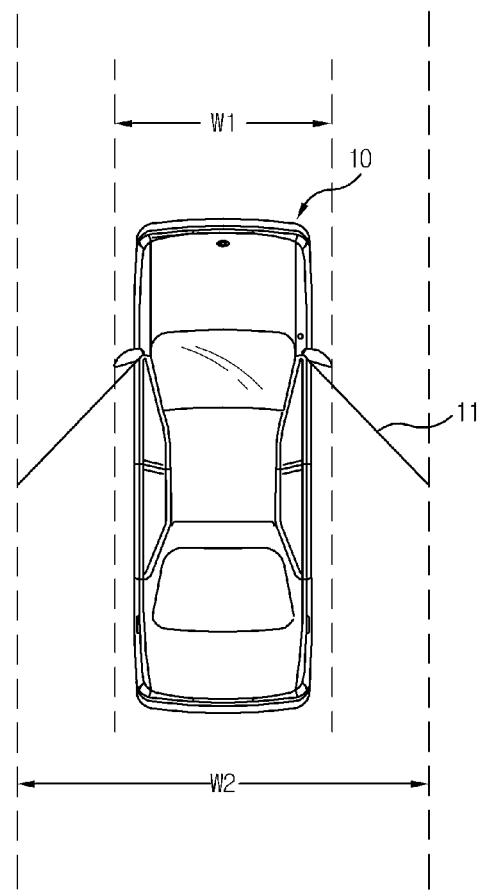

[Fig. 6]
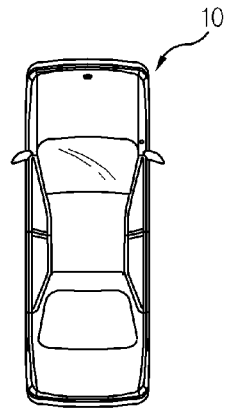
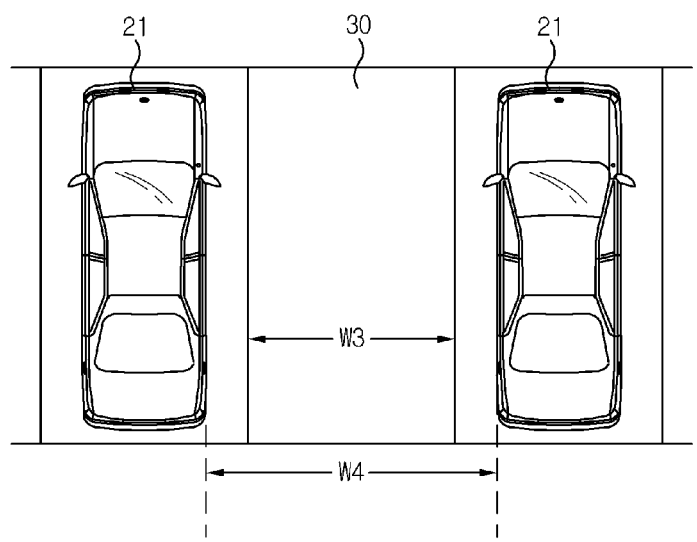
[Fig. 7]
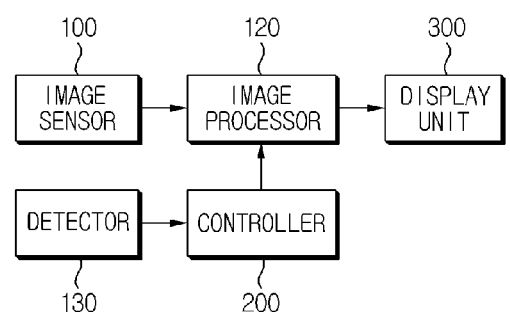

[Fig. 8a]
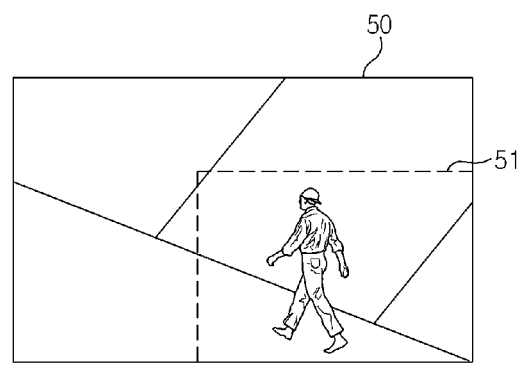
[Fig. 8b]
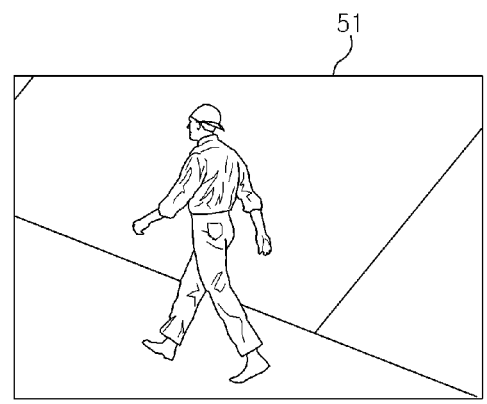

CAMERA APPARATUS OF VEHICLE

TECHNICAL FIELD

The teachings in accordance with exemplary embodiments of this invention relate generally to a camera apparatus of vehicle.

BACKGROUND ART

Today, many vehicles employ rear-view mirrors (at room and outside of vehicle) that are designed to enable an operator to see rearward, for example, to detect obstructions when in reverse as well as to see on-coming traffic from the rearward direction. The rear-view mirror enables an operator to view through a vehicle's rear window while continuing to face forward.

That is, an operator of a vehicle must recognize objects such as other motor vehicles move with respect to the vehicle being driven by the driver. Such as being the case, the driver must constantly review his or her surroundings to determine whether a desired path of travel is obstructed and, if the desired path is taken, it would cause a collision. Tools that assist a driver in reviewing the space surrounding the motor vehicle include the rear view mirror and the side rear view mirrors. These mirrors allow the driver to review the surroundings generally disposed behind the driver without the driver having to turn his or her head more than a minimal amount. Locations commonly referred to as "blind spots (or dead zones)" exist on either side of the motor vehicle. These blind spots are spaces that are not visible to the driver when the driver is looking in the mirrors. Therefore, the viewing of these blind spots requires the driver to turn his or her head to look to see if another motor vehicle of some other object has entered the blind spots. In certain cases, the driver must get off the vehicle to personally check or let other people check if there is no obstacle, causing inconvenience, fender bender or safety accident.

To overcome this problem, it is thus known to provide a camera device or an imaging sensor on a vehicle for providing an image of a scene occurring exteriorly or interiorly of the vehicle to a driver of the vehicle. That is, in addition to rear-view and side-view mirrors, many vehicles are recently being equipped with rear-view camera device. One motivation of equipping passenger vehicles with rear-view cameras is to enable an operator to view directly behind the vehicle when in reverse.

DISCLOSURE OF INVENTION

Technical Problem

Accordingly, embodiments of the present invention may relate to a camera apparatus of a vehicle that substantially obviates one or more of the above disadvantages/problems due to limitations and disadvantages of related art.

The technical subject of the present invention is to provide a camera apparatus of a vehicle configured to view a bright image in the night, and view an object or an obstacle moving in the rear side of the vehicle, whereby accidents can be prevented in advance for safe driving, and configured to allow characters of whether to park to be combined and displayed on a subject image, whereby a driver is provided a chance of safe parking.

Technical problems to be solved by the present invention are not restricted to the above-mentioned, and any other technical problems not mentioned so far will be clearly appreciated from the following description by skilled in the art.

Solution to Problem

A camera apparatus of a vehicle according to one exemplary embodiment of the present invention comprising: an image sensor converting an optical image of a subject to an electric signal; a brightness measurer measuring brightness of the image sensor; and a controller controlling an image quality of the optical image of the subject using the brightness measured by the brightness measurer.

Preferably, but not necessarily, the controller is configured to output a register to the image sensor for controlling the image sensor, and the register is configured to change the image quality of the optical image of the subject in response to the brightness of the image sensor.

Preferably, but not necessarily, the camera apparatus further comprising storage for storing the register.

Preferably, but not necessarily, the register includes at least any one of gamma, white balance, sharpness and contrast.

A camera apparatus of a vehicle according to one exemplary embodiment of the present invention comprising: an image sensor converting an optical image of a subject to an electric signal; a detector detecting the subject; an image processor processing the optical image of the subject; a display unit displaying the image processed by the image processor on a screen; storage storing information on width of a vehicle and whether to park; and a controller determining whether to park in response to the width of the vehicle stored in the storage and controlling the image processor in response to the determination.

Preferably, but not necessarily, the image processor combines the information stored in the storage on whether to park with the optical image of the subject in response to the control of the controller.

Preferably, but not necessarily, the camera apparatus further comprising an audio output unit outputting the information on whether to park in audio sound in response to the control of the controller.

A camera apparatus of a vehicle according to one exemplary embodiment of the present invention comprising: an image sensor converting an optical image of a subject to an electric signal; a detector detecting a moving object or an obstacle; an image processor processing the optical image of the subject; and a display unit displaying the image processed by the image processor on a screen.

Preferably, but not necessarily, the controller controls the image processor so that an area where a relevant moving object or obstacle is located can be well indicated, in a case the detector detects a moving object or an obstacle from the optical image of the subject.

Advantageous Effects of Invention

The camera apparatus of a vehicle according to the present invention has an advantageous effect in that an image quality of an image can be adequately changed in response to brightness of an optical image of a subject to allow a driver to view a bright image even in the night, thereby preventing an accident and enabling a safe driving.

The camera apparatus of a vehicle according to the present invention has another advantageous effect in that a width of a maximally opened door of a vehicle and a width of a parking space are compared to allow a character of whether to park to be combined with an image of a subject and displayed, thereby enabling a driver to safely park the vehicle.

The camera apparatus of a vehicle according to the present invention has still another advantageous effect in that a driver can view a moving object or an obstacle at the rear of a vehicle when the driver is driving the vehicle backward, thereby preventing an accident from happening.

BRIEF DESCRIPTION OF DRAWINGS

FIG. 1 is a schematic block diagram illustrating a camera apparatus of vehicle according to a first exemplary embodiment of the present invention.

FIGS. 2a and 2b are schematic views illustrating an image photographed by a camera apparatus of vehicle according to a first exemplary embodiment of the present invention.

FIG. 3 is a schematic block diagram illustrating a camera apparatus of vehicle according to a second exemplary embodiment of the present invention.

FIG. 4 is a schematic view illustrating an image photographed by a camera apparatus of vehicle according to a second exemplary embodiment of the present invention.

FIG. 5 is a schematic view illustrating a data of vehicle width stored in storage of a camera apparatus of vehicle according to a second exemplary embodiment of the present invention.

FIG. 6 is a schematic view illustrating a width of parking space detected by a parking space width detector of a camera apparatus of vehicle according to a second exemplary embodiment of the present invention.

FIG. 7 is a schematic block diagram illustrating a camera apparatus of vehicle according to a third exemplary embodiment of the present invention.

FIGS. 8a and 8b are schematic views illustrating an image photographed by a camera apparatus of vehicle according to a third exemplary embodiment of the present invention.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thus," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the camera apparatus of a vehicle according to exemplary embodiments of the present invention will be described in detail with reference to the accompanying drawings.

FIG. 1 is a schematic block diagram illustrating a camera apparatus of vehicle according to a first exemplary embodiment of the present invention, FIGS. 2a and 2b are schematic views illustrating an image photographed by a camera apparatus of vehicle according to a first exemplary embodiment of the present invention.

Referring to FIGS. 1 and 2b, a camera apparatus of vehicle according to the present invention includes an image sensor (100) converting an optical image of a subject to an electric signal; a brightness measurer (110) measuring brightness of the image sensor (100); and a controller (200)

controlling an image quality of the optical image of the subject using the brightness measured by the brightness measurer (110).

Thus, the camera apparatus of a vehicle is such that the brightness measurer (110) measures the brightness of the image sensor (100) relative to the optical image of the subject, and the controller (200) controls an image quality of the optical image of the subject using the brightness measured by the brightness measurer (110). At this time, the image sensor (100) is available with registers capable of setting values for controlling an operation of the image sensor (100) relative to the image quality of the optical image of the subject. As a result, the controller (200) in the camera apparatus of vehicle according to the present invention outputs the registers to the image sensor (100), whereby the image sensor (100) can be controlled.

In another configuration and method of the present invention, a camera apparatus of vehicle according to the present invention may further include storage for storing a LUT (Lookup Table) comprised of register values capable of changing the image quality of the optical image of the subject in response to the brightness of the image sensor (100). The controller (200) reads data in the LUT of the storage to control the image sensor (100).

Furthermore, the register values include at least any one of gamma, white balance, sharpness and contrast values. The storage may use a flash memory. In a nutshell, the camera apparatus of a vehicle according to the present invention has an advantageous effect in that an image quality of an image can be adequately changed in response to brightness of an optical image of a subject to allow a driver to view a bright image even in the night, thereby preventing an accident and enabling a safe driving.

That is, as shown in FIG. 2a, an image photographed in the night is dark in brightness and can be changed to a bright clear image. Furthermore, the camera apparatus of a vehicle according to the first embodiment of the present invention may be installed at any one of a front side, a rear side and both sides of the vehicle.

FIG. 3 is a schematic block diagram illustrating a camera apparatus of vehicle according to a second exemplary embodiment of the present invention, FIG. 4 is a schematic view illustrating an image photographed by a camera apparatus of vehicle according to a second exemplary embodiment of the present invention, FIG. 5 is a schematic view illustrating a data of vehicle width stored in storage of a camera apparatus of vehicle according to a second exemplary embodiment of the present invention, and FIG. 6 is a schematic view illustrating a width of parking space detected by a parking space width detector of a camera apparatus of vehicle according to a second exemplary embodiment of the present invention.

Referring to FIGS. 3 to 6, the camera apparatus of vehicle according to the second exemplary embodiment of the present invention is such that the image sensor (100) is mounted at a rear side of the vehicle to photograph an optical image of a subject in the rear side of the vehicle.

Thus, the camera apparatus of vehicle according to the second exemplary embodiment of the present invention includes an image sensor (100) converting an optical image of a subject at a rear side of a vehicle to an electric signal, storage (150) storing information on width of the vehicle and whether to park, a detector (130) detecting a width of a parking space, in a case the subject at the rear side of the vehicle is the parking space, an image processor (120) combining the information on whether to park with the image of the subject of the image sensor (100), and a controller (200) comparing the information on the width of the vehicle stored in the storage (150) with the width of the parking space detected by the detector (130), and controlling the image processor (120) in response to a result of the comparison.

Now, operation of the camera apparatus of vehicle according to the second exemplary embodiment of the present invention will be described.

In a case a vehicle is to be parked at a parking space, the image sensor (100) photographs a parking space at the rear side of the vehicle. The detector (130) detects the width of the parking space, and the controller (200) determines whether the width of the vehicle stored in the storage (150) is greater than the width of the parking space detected by the detector (130), and outputs a control signal to the image processor (120) in response to a result of the determination.

First, a width (W2) of a maximally opened door (11) of a vehicle and a width of a parking space are compared, and then, a width (W1) of a closed door (11) of the vehicle and a width of the parking space are compared. At this time, the image processor (120) combines a parking non-allowed character stored in the storage (150) with the image of subject in the parking space, in a case the width of the vehicle is greater than the width of the parking space. Then, the image processor (120) reads out a parking allowed character stored in the storage (150) to combine with the image of subject in the parking space, in a case the width of the vehicle is smaller than the width of the parking space.

Thus, because it is difficult to park a vehicle and to open a door, if the parking space is narrow, the camera apparatus of vehicle according to the second exemplary embodiment of the present invention advantageously compares the width of a vehicle with a maximally opened door with the width of the parking space, and combines the character of whether to park with the image of the subject, whereby a driver can safely park the vehicle.

Furthermore, as illustrated in FIG. 3, the controller (200) in the camera apparatus of vehicle according to the second exemplary embodiment of the present invention may be configured to output a notifying sound through a speaker (220), notifying that it is impossible to park or it is possible to park by controlling an audio processor (210) based on whether availability of parkable parking space.

The image of the subject combined by the image processor (120) is displayed on a display unit (300). Thus, as shown in FIG. 4, an image (A) of the subject is combined with a 'parking available' character and displayed on the display unit (300). In addition, as illustrated in FIG. 5, the storage (150) is stored with data of a closed state of a door (11) of a vehicle (10) or data of the widths (W1, W2) of the vehicle (10) where the door (11) is maximally opened. As illustrated in FIG. 6 according to an exemplary embodiment of the present invention, a width (W3) of a parking space may be defined by a distance between parking lines of a space (30) for vehicle parking. As illustrated in FIG. 6 according to another exemplary embodiment of the present invention, a width (W4) of a parking space detected by the parking space width detector (130) may be defined by a width between vehicles (21) parked near to the space (30), but it should be apparent to the skilled in the art that the definition of widths (W3, W4) is not limited thereto.

MODE FOR THE INVENTION

FIG. 7 is a schematic block diagram illustrating a camera apparatus of vehicle according to a third exemplary embodiment of the present invention, and FIGS. 8a and 8b are schematic views illustrating an image photographed by a camera apparatus of vehicle according to a third exemplary embodiment of the present invention.

In the camera apparatus of vehicle according to a third exemplary embodiment of the present invention by referring to FIGS. 7 and 8, the image sensor (100) according to the first exemplary embodiment of the present invention is also mounted at the rear side of the vehicle to photograph an optical image of the subject at the rear side of the vehicle, and to display an area having a dangerous element, in a case the dangerous element is available in the image of the subject by cutting out the area.

That is, the camera apparatus of vehicle according to a third exemplary embodiment of the present invention includes an image sensor (100) converting an optical image of a subject at the rear of a vehicle to an electric signal, a detector (130) detecting a moving object or a moving obstacle at the rear side of the vehicle, an image processor (120) cutting out an area where the moving object or an obstacle are available from the image of the subject of the image sensor (100) and displaying the cut-out area on a display unit (300).

Thus, the camera apparatus of vehicle according to a third exemplary embodiment of the present invention is such that the detector (130) detects a moving object or a moving obstacle at the rear side of the vehicle, and the image processor (120) cuts out an area where the moving object or the moving obstacle are available from the image of the subject at the rear side of the vehicle and displays the cut-out area on a display unit (300), whereby a driver can view a moving object or an obstacle on the image of the subject at the rear side of the vehicle during reversing the vehicle.

In the camera apparatus of vehicle according to the present invention a driver can view a moving object or an obstacle on the image of the subject at the rear side of the vehicle during reversing the vehicle. Thus, accidents can be prevented A signal of the moving object or an obstacle detected by the detector (130) is inputted to the controller (200), which in turn controls the image processor (120). The moving object may include a man, an animal, a bicycle, a motorbike, a vehicle, a rolling object, a falling object, but it should be apparent to the skilled in the art that the moving object is not limited thereto.

For example, in a case size of the image photographed by the image sensor is 1,280×800, and resolution of the display unit (300) is 640×480, a dangerous element area as large as 640×480 is cut out from the image of 1,280×800 and displayed on the display unit (300).

That is, as shown in FIG. 8a, a dangerous element area (51) is cut out from an image (50) at the rear of the vehicle, and displayed on the display unit (300) as illustrated in FIG. 8b.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the camera apparatus of a vehicle according to the present invention have industrial applicability in that an image quality of an image can be adequately changed in response to brightness of an optical image of a subject to allow a driver to view a bright image even in the night, thereby preventing an accident and enabling a safe driving, a width of a maximally opened door of a vehicle and a width of a parking space are compared to allow a character of whether to park to be combined with an image of a subject and displayed, thereby enabling a driver to safely park the vehicle, and a driver can view a moving object or obstacle at the rear of a vehicle when the driver is driving the vehicle backward, thereby preventing an accident from happening.

The invention claimed is:
1. A camera apparatus of a vehicle, comprising:
an image sensor converting an optical image of a subject to an electric signal, wherein the image sensor is formed therein with registers capable of setting values for controlling an operation of the image sensor relative to an image quality of the optical image of the subject;
a brightness measurer configured to measure brightness of the image sensor;
a storage comprising a first storage storing a LUT (Lookup Table) comprising register values capable of changing the image quality of the optical image of the subject in response to the brightness of the image sensor and a second storage storing data of a width of the vehicle;
an image processor processing the optical image of the subject;
a display unit displaying the image processed by the image processor on a screen; and
a processor configured to:
control the image quality of the optical image of the subject using data in the LUT of the first storage,
determine whether to park in response to the width of the vehicle stored in the second storage, and
control the image processor so that an area where at least one of a relevant moving object and a relevant moving obstacle is located is indicated,
wherein the camera apparatus is configured to detect a width corresponding to a space for a vehicle parking and detect at least one of a moving object and a moving obstacle,
wherein the register values of the first storage comprise at least any one of gamma, white balance, sharpness and contrast,
wherein the processor is configured to read the register values in the LUT of the first storage and output the register values to the image sensor for controlling the image sensor to change the image quality of the optical image of the subject in response to the brightness of the image sensor,
wherein the storage uses a flash memory,
wherein the processor compares a width of a opened door of a vehicle and a width of a first parking space defined by a width between vehicles parked near to the space for vehicle parking and then the processor compares a width of a closed door of the vehicle and a width of a second parking space defined by a distance between parking lines of the space for vehicle parking so that the processor determines whether or not the vehicle is parked,
wherein the camera apparatus is configured to:
determine whether a parking space is available,
control an audio processor to output a sound indicating that the parking space is available, and display, on the display unit, an image of the available parking space together with at least one adjacent parking space and a parking allowed character indicating that parking is available, wherein the image processor cuts out a cut-out area where at least one of the moving object and the moving obstacle are available from the optical image of the subject at a rear side of the vehicle and displays the cut-out area on the display unit, and wherein the cut-out area has an area smaller than the area of the optical image of the subject and is displayed on an entire portion of the display unit.

2. The camera apparatus of claim 1, further comprising an audio output unit outputting information on whether to park in audio sound in response to the control of the processor.

3. The camera apparatus of claim 1, wherein a dark optical image of the subject photographed at night is changed to a bright clear image by the processor.

4. The camera apparatus of claim 1, wherein the image processor combines a parking non-allowed character with the optical image of the subject in the space for vehicle parking, in a case the width of the opened door of the vehicle is greater than the width of the first parking space defined by the width between vehicles parked near to the space for vehicle parking.

5. The camera apparatus of claim 1, wherein the image processor combines a parking non-allowed character with the optical image of the subject in the space for vehicle parking, in a case the width of the closed door of the vehicle is greater than the width of the second parking space defined by the distance between parking lines of the space for vehicle parking.

6. The camera apparatus of claim 1, wherein the image processor reads out the parking allowed character to combine with the optical image of the subject in the space for vehicle parking, in a case the width of the closed door of the vehicle is shorter than the width of the second parking space defined by the distance between parking lines of the space for vehicle parking and the width of the closed door of the vehicle is shorter than the width of the second parking space defined by the distance between parking lines of the space for vehicle parking.

7. The camera apparatus of claim 1, wherein the moving object comprises at least one of a man, an animal, a bicycle, a motorbike, a vehicle, a rolling object and a falling object.

8. A vehicle, comprising the camera apparatus of claim 1 disposed on at least one of a front side, a rear side and both the front and rear sides of the vehicle.

* * * * *